US012515656B2

(12) United States Patent
Awathe et al.

(10) Patent No.: US 12,515,656 B2
(45) Date of Patent: Jan. 6, 2026

(54) VEHICULAR CONTROL SYSTEM WITH ENHANCED TRAJECTORY PLANNING AND MOTION CONTROL

(71) Applicant: Magna Electronics Inc., Auburn Hills, MI (US)

(72) Inventors: Arpit Awathe, Auburn Hills, MI (US); Tejas Murlidhar Varunjikar, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 164 days.

(21) Appl. No.: 18/425,265

(22) Filed: Jan. 29, 2024

(65) Prior Publication Data

US 2024/0253622 A1 Aug. 1, 2024

Related U.S. Application Data

(60) Provisional application No. 63/518,461, filed on Aug. 9, 2023, provisional application No. 63/506,856, filed on Jun. 8, 2023, provisional application No. 63/494,017, filed on Apr. 4, 2023, provisional application No. 63/482,310, filed on Jan. 31, 2023.

(51) Int. Cl.
*B60W 30/12* (2020.01)
*B60W 10/20* (2006.01)

(52) U.S. Cl.
CPC ............ *B60W 30/12* (2013.01); *B60W 10/20* (2013.01); *B60W 2710/20* (2013.01)

(58) Field of Classification Search
CPC .. B60W 30/12; B60W 10/20; B60W 2710/20; B60W 30/14; B60W 30/18163

USPC ......................................................... 701/41
See application file for complete search history.

(56) References Cited

U.S. PATENT DOCUMENTS

| | | |
|---|---|---|
| 4,633,423 A | 12/1986 | Bailey |
| 5,189,621 A | 2/1993 | Onari et al. |
| 5,550,677 A | 8/1996 | Schofield et al. |
| 5,670,935 A | 9/1997 | Schofield et al. |
| 5,949,331 A | 9/1999 | Schofield et al. |
| 6,401,016 B1 | 6/2002 | Yoshino et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 8,155,839 B2 | 4/2012 | Nakano et al. |
| 8,868,221 B1 | 10/2014 | Mealy |
| 9,873,450 B2 | 1/2018 | Pramod et al. |
| 10,071,687 B2 | 9/2018 | Ihlenburg et al. |
| 10,099,614 B2 | 10/2018 | Diessner |

(Continued)

*Primary Examiner* — Yi-Kai Wang
(74) *Attorney, Agent, or Firm* — HONIGMAN LLP

(57) ABSTRACT

A method for adjusting an advanced driving assist system for a vehicle includes determining a quintic polynomial in a Frenet frame. The quintic polynomial represents a non-linear trajectory of a vehicle. A plurality of coefficients of the quintic polynomial is determined. Using the quintic polynomial and the plurality of coefficients, a linear expression that represents a respective trajectory at a respective point along the non-linear trajectory of the vehicle is determined. Vehicle dynamics of the vehicle are modeled using the linear expression. A target path for the vehicle is simulated. A steering command, using the model, to maneuver the vehicle is determined. Based at least in part on the steering command, an advanced driving assist system of the vehicle is adjusted.

20 Claims, 13 Drawing Sheets

(56) References Cited

U.S. PATENT DOCUMENTS

| | | |
|---|---|---|
| 10,424,136 B2 | 9/2019 | Oh et al. |
| 10,841,571 B2 | 11/2020 | Sigle |
| 10,870,400 B2 | 12/2020 | Thomas et al. |
| 11,110,794 B2 | 9/2021 | Yokota et al. |
| 11,403,857 B2 | 8/2022 | Sathyanarayana et al. |
| 11,609,304 B2 | 3/2023 | Kunkel |
| 11,620,522 B2 | 4/2023 | Potnis |
| 11,643,104 B2 | 5/2023 | Ustunel |
| 11,745,749 B2 | 9/2023 | Potnis |
| 12,258,014 B2 | 3/2025 | Varunjikar et al. |
| 2009/0012669 A1 | 1/2009 | Takenaka et al. |
| 2010/0152952 A1 | 6/2010 | Lee et al. |
| 2013/0261897 A1 | 10/2013 | Potter et al. |
| 2016/0210775 A1 | 7/2016 | Alaniz et al. |
| 2017/0306874 A1 | 10/2017 | Wu et al. |
| 2019/0138432 A1 | 5/2019 | Nagaraj et al. |
| 2019/0146492 A1 | 5/2019 | Phillips et al. |
| 2019/0276043 A1 | 9/2019 | Uchida et al. |
| 2019/0377339 A1* | 12/2019 | Nath .................... B60W 10/18 |
| 2020/0062259 A1 | 2/2020 | Huh |
| 2020/0249684 A1 | 8/2020 | Onofrio et al. |
| 2020/0339109 A1 | 10/2020 | Hong et al. |
| 2021/0255984 A1 | 8/2021 | Khatri |
| 2022/0009522 A1 | 1/2022 | Zhang et al. |
| 2022/0048566 A1 | 2/2022 | Prasad Challa et al. |
| 2022/0135030 A1 | 5/2022 | Varunjikar et al. |
| 2022/0176960 A1 | 6/2022 | Awathe et al. |
| 2022/0363250 A1 | 11/2022 | Varunjikar et al. |
| 2023/0008230 A1 | 1/2023 | Cordeiro et al. |
| 2023/0134480 A1* | 5/2023 | Varunjikar ............. G06F 30/20 |
| | | 701/41 |
| 2023/0270515 A1 | 8/2023 | Tanabe et al. |
| 2023/0415734 A1 | 12/2023 | Zhu et al. |
| 2024/0253622 A1 | 8/2024 | Awathe et al. |

\* cited by examiner

| | |
|---|---|
| $\theta_v$ | Vehicle Heading |
| $\theta_p$ | Path Heading |
| $e_{cg}$ | Lateral Offset |
| $\dot{e}_{cg}$ | $\dfrac{d(e_{cg})}{dt}$ |
| $\theta_e$ | Heading Error |
| $\dot{\theta}_e$ | $\dfrac{d(\theta_e)}{dt}$ |

Bode plot for $k_r$ vs $e_{cg}$

Bode plot for $k_r$ vs $\dot{e}_{cg}$

Bode plot for $k_r$ vs $\theta_e$

Bode plot for $k_r$ vs $\dot{\theta}_e$

VEHICULAR CONTROL SYSTEM WITH ENHANCED TRAJECTORY PLANNING AND MOTION CONTROL

CROSS REFERENCE TO RELATED APPLICATIONS

The present application claims the filing benefits of U.S. provisional application Ser. No. 63/518,461, filed Aug. 9, 2023, U.S. provisional application Ser. No. 63/506,856, filed Jun. 8, 2023, U.S. provisional application Ser. No. 63/494,017, filed Apr. 4, 2023, and U.S. provisional application Ser. No. 63/482,310, filed Jan. 31, 2023, which are all hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A method for adjusting an advanced driving assist system for a vehicle includes determining a quintic polynomial in a Frenet frame associated with a vehicle. The quintic polynomial represents a non-linear trajectory of the vehicle. The method includes determining a plurality of coefficients of the quintic polynomial. The method also includes determining, using the quintic polynomial and the plurality of coefficients, a linear expression that represents a respective trajectory at a respective point along the non-linear trajectory of the vehicle. The method includes modeling, using the linear expression, vehicle dynamics of the vehicle and simulating a target path for the vehicle. The method includes determining an offset of the non-linear trajectory of the vehicle relative to the simulated target path and determining a target point along the simulated target path. The method also includes determining, using the model, a steering command to maneuver the vehicle toward the target point along the simulated target path. The method includes adjusting an advanced driving assist system based at least in part on the steering command.

These and other objects, advantages, purposes and features of the present invention will become apparent upon review of the following specification in conjunction with the drawings.

DESCRIPTION OF THE PREFERRED EMBODIMENTS

Figure 1:
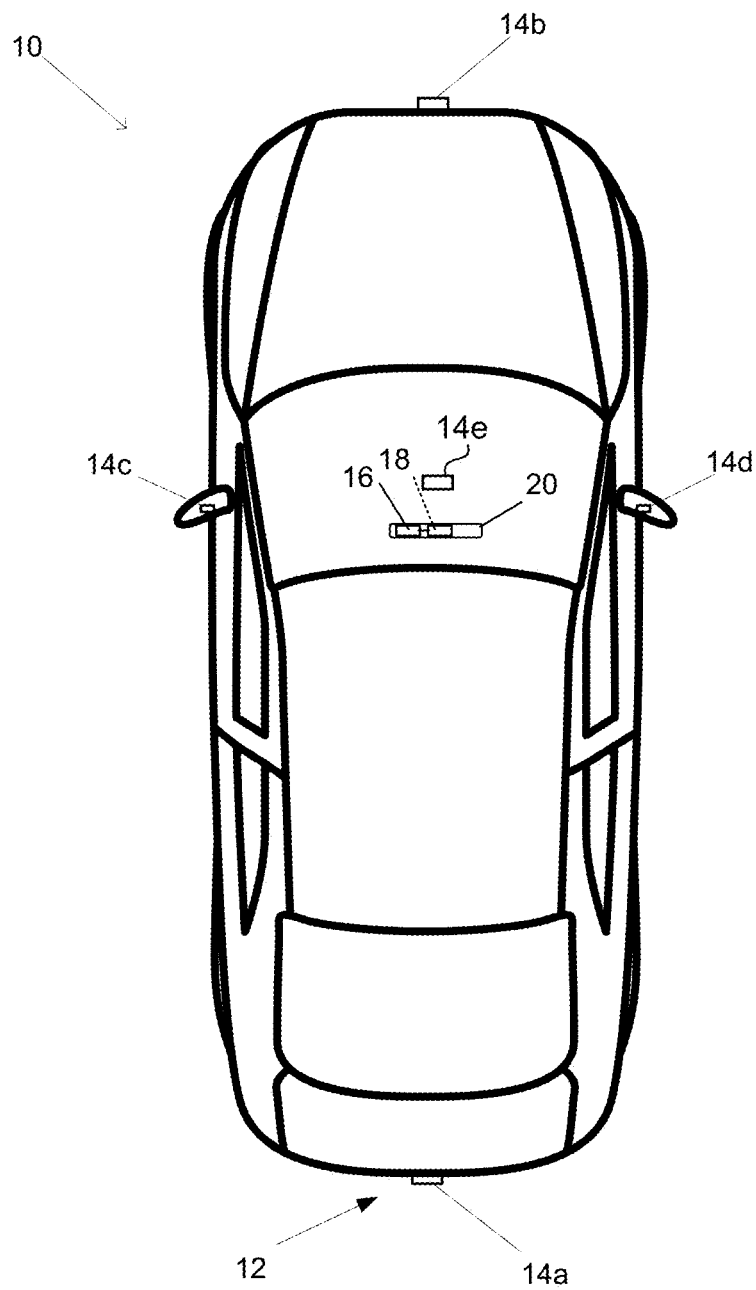
FIG. 1 is a plan view of a vehicle with a vehicular control system or driving assist system that incorporates cameras.

A vehicle vision system and/or driver or driving assist system and/or control system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Generating a smooth trajectory to follow a desired path and its precise tracking is crucial and a key performance index for several autonomous and assisted driving features like lane centering features, lane change features, evasive maneuver assist features, etc. These features often involve multiple control loops like trajectory planning, motion controller, and low-level actuation controller. While trajectory planning, motion controller techniques, low level steering actuation controller, and dynamic vehicle model have been studied, the combined effect of trajectory planning with the motion controller with vehicle lateral dynamics is a less explored area. Importantly, the trajectory planning module itself behaves as a feedback controller which further makes the coupling complex. Also, the individual effects of these modules do not translate into the desired vehicle behavior. The systems and methods discussed herein focus on representing dynamics when combining the trajectory planning in Frenet coordinates, the motion controller with vehicle model to understand its overall effect on the vehicle lateral dynamics, and autonomous/ADAS feature performance. To identify the model parameters, system identification techniques may be used. Furthermore, the plant models identified may be used to analyze the effect of tuning parameters and to improve the lateral feature performance in-vehicle.

Automotive technology has made huge advances in recent times, which were made possible because of improvements in sensor technologies, hardware, processing time, and the associated cost. This has resulted in evolution/development of several autonomous and assisted driving features common in the vehicle software package. Automotive groups are adding these features to provide additional driving comfort and to reduce driver fatigue, while regulations have mandated the presence of some safety features. Several vehicle models are offering the driver assistance feature like lane centering, lane change, automatic emergency braking, etc. The development cycle of these features often starts with assumption of ideal environmental and vehicle conditions.

As discussed herein, a linear mathematical model (e.g., a system of linear differential equations) is developed for the modules consisting of trajectory planning in Frenet frame and motion control with the dynamic vehicle model. The linearization may be completed using geometry and some assumptions. This model may be analyzed (e.g., using frequency-domain analysis) to understand the behavior of vehicle state. A simulation setup may be developed to tune or adjust the model/parameters to achieve the desired vehicle behavior (e.g., using a processor or other data processing hardware). The practical application may be implemented on a test vehicle while operating the driver assistance feature (e.g., a lane centering feature), such as an end-to-end feature, e.g., from camera sensor output to steering actuation.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera 14e may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The automotive industry is continuously innovating technologies to make current and future vehicles more comfortable and safer to drive. The automated driving assistance system (ADAS) technology is at the forefront to make this happen. A number of today's new motor vehicles have technology that help drivers, for example, avoid drifting into adjacent lanes or making unsafe lane changes, warn drivers of other vehicles behind them when they are backing up, brake automatically when a vehicle ahead of them stops or slows suddenly, etc. These and other safety technologies use a combination of hardware (sensors such as cameras, radar, lidar, etc.) and software to help vehicles identify certain safety risks so they can warn the driver to act or autonomously/semi-autonomously control the vehicle in order to avoid a crash. These safety features enhance safety of the equipped vehicles and other vehicles sharing the road. In addition, there are several common features that make daily driving more comfortable and reduce driver fatigue. These comfort features include adaptive cruise control (ACC), lane keeping assist, lane centering assist, automated lane change, traffic jam assist, etc.

Figure 2:
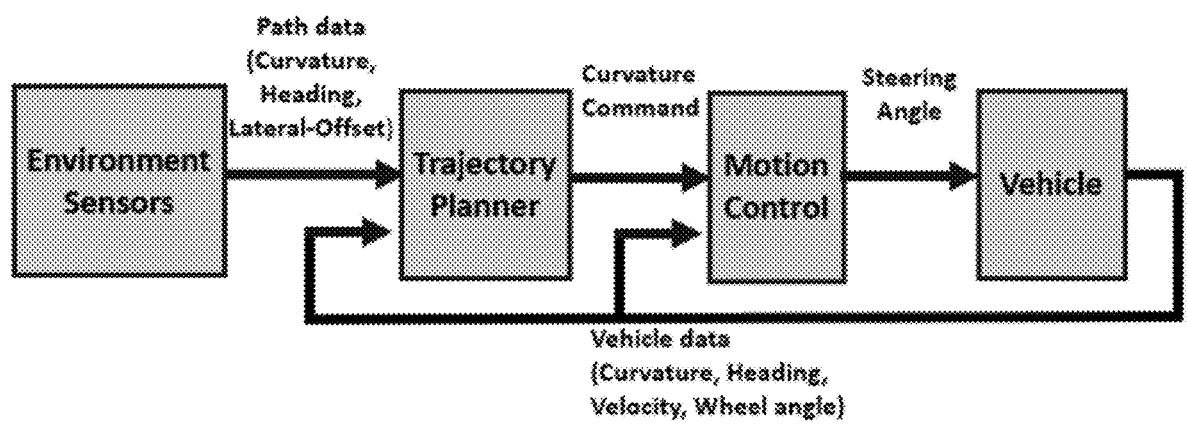
FIG. 2 is a schematic showing the architecture for a lane centering system.

The lane centering feature can be bifurcated or divided into several components such as obtaining the raw data from environmental sensors, path or trajectory planning, motion control, and low level controller steering actuation. A conventional lane centering system architecture is shown in FIG. 2. The environmental sensors block (e.g., a camera) provides information about a target path or trajectory to follow. The trajectory planner module plans a desired trajectory to reach (or near to) the path with some constraints. The motion control module uses the planned trajectory to generate a steering angle command for the vehicle. While examples herein assume ideal steering system response, i.e., a steering angle command is assumed to translate to vehicle wheel angle without any delay to help focus on the analysis of the combined effect of the trajectory planner and the motion control modules, the examples may be extended to consider steering dynamics. When tuning the different blocks within the feature, it is important to understand the resulting effect of various module parameters on the dynamics of the closed-loop system. Optionally, each module may be tuned until perfection and then only one of the parameters from a specific module be changed to understand its effect.

The calibrations of each module can affect the other modules, such as changing the trajectory planning module can affect the motion controller dynamics which can again affect the low-level actuation control. Thus, a mathematical model which can represent vehicle lateral dynamics with all the blocks would ease the process of tuning and provide insight on how the model behaves with respect to the different system parameters. A specific type of trajectory planning algorithm is provided herein that generates a quintic polynomial trajectory in the Frenet coordinates, while the generated trajectory outputs multiple information of trajectory like position, heading, curvature etc. Curvature information for the motion control may be used to track the generated trajectory.

Dynamic Bicycle Model in Path Coordinates:

The use of a bicycle model (see FIG. 3) for vehicle dynamics representation is well-recognized in the automotive industry. The traditional bicycle model has two states in the state-space representation as shown in the equation below.

$$\begin{bmatrix} \dot{v}_y \\ \ddot{\theta}_v \end{bmatrix} = \begin{bmatrix} \frac{-(C_f + C_r)}{mv} & \frac{l_r C_r - l_f C_f}{mv} - v \\ \frac{l_r C_r - l_f C_f}{l_z v} & \frac{-(l_f^2 C_f + l_r^2 C_r)}{l_z v} \end{bmatrix} \begin{bmatrix} v_y \\ \dot{\theta}_v \end{bmatrix} + \begin{bmatrix} \frac{C_f}{m} \\ \frac{l_f C_f}{l_z} \end{bmatrix} \delta$$

Here, the states of the equation include lateral velocity $v_y$ and vehicle heading $\theta_v$ and the time derivative of these states are the rate of change of lateral velocity $\dot{v}_y$ and the vehicle's yaw rate $\dot{\theta}_v$. The input to this model is the wheel angle $\delta$. Other vehicle parameters used are front and rear cornering stiffness $C_f$ and $C_r$. The distance of the front and rear axle from the vehicle's center of gravity is represented by $l_f$, $l_r$. The moment of inertia is $I_z$ and the vehicle mass is m respectively.

Figure 3:
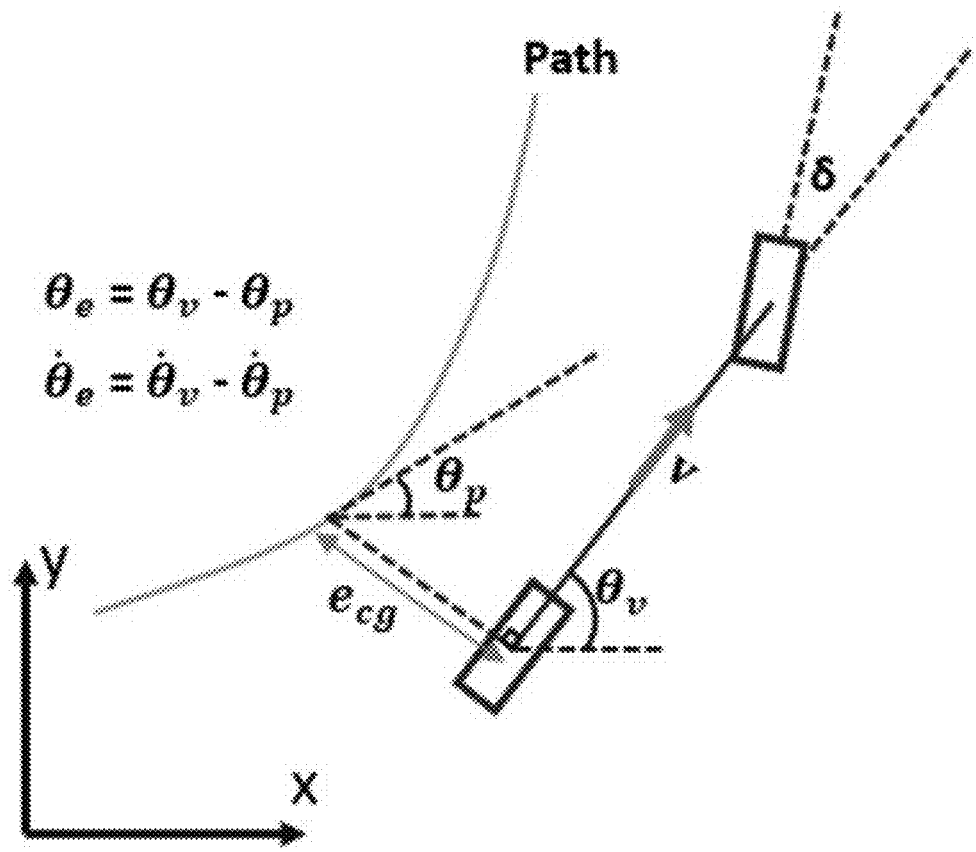
FIG. 3 is a schematic showing a bicycle model in path coordinates.

This state-space model can be further expanded when using the bicycle model for trajectory tracking. This plant model is shown in FIG. 3. From FIG. 3, it is apparent that the orthogonal axis originating from the rear axle of the vehicle is intersecting the path. The variables $\theta_v$, $\theta_p$ are the heading angles of the vehicle and path respectively, while $\theta_e$ is their relative heading angle. Whereas, $\dot{\theta}_v$, $\dot{\theta}_p$, $\dot{\theta}_e$ are the yaw rate of the vehicle, path, and their relative error respectively. The variable $e_{cg}$ is the lateral offset, $\dot{e}_{cg}$ is its rate of change, and v is vehicle velocity. These parameters are listed in the table below.

| S. No | Parameter | Description |
|---|---|---|
| 1 | $v_y$ | Vehicle Lateral velocity |
| 2 | $\theta_v$ | Vehicle heading angle |
| 3 | $\dot{v}_y$ | Rate of change of lateral velocity |
| 4 | $\dot{\theta}_v$ | Vehicles yaw rate |
| 5 | $\delta$ | Wheel angle |
| 6 | $C_f$ | Front cornering stiffness |
| 7 | $C_r$ | Rear cornering stiffness |
| 8 | $l_f$ | Front axle distance from the vehicle's center of gravity |
| 9 | $l_r$ | Rear axle distance from the vehicle's center of gravity |
| 10 | $l_z$ | Moment of inertia |
| 11 | $\theta_p$ | Heading angle of the path |
| 12 | $\theta_e$ | Relative heading angle between vehicle and the path |
| 13 | $\dot{\theta}_p$ | Yaw rate of the path |
| 14 | $\dot{\theta}_e$ | Error in yaw rate of the vehicle and the path |
| 15 | $e_{cg}$ | Lateral offset |
| 16 | $\dot{e}_{cg}$ | Rate of change of lateral Offset |
| 17 | v | Vehicle velocity |
| 18 | $k_x$ | Curvature of the vehicle |
| 19 | $k_r$ | Curvature of the path |
| 20 | $k_{xd}$ | Desired vehicle curvature |
| 21 | s | Distance traveled along the path |
| 22 | d | Perpendicular offset from the path |
| 23 | d' | First derivative of the perpendicular offset from the path |
| 24 | d" | Second derivative of the perpendicular offset from the path |
| 25 | $T_H$ | Horizon time for which a trajectory should be generated |
| 26 | $X_H$ | Distance traveled by vehicle |
| 27 | t | Any given point of time which is less than the horizon time |
| 28 | $K_{us}$ | Understeer gradient |
| 29 | $K_P$ | Proportional gain |
| 30 | $K_I$ | Integral gain |
| 31 | $K_D$ | Derivative gain |
| 32 | $t_{la}$ | lookahead time |

The state-space representation may be expanded to a four-state path model where the state matrix X is defined as:

$$X = \begin{bmatrix} e_{cg} & \dot{e}_{cg} & \theta_e & \dot{\theta}_e \end{bmatrix}^T$$

The state space model may then be defined as:

$$\dot{X} = AX + B_1 \delta + B_2\, r(s)$$

These equations are the mathematical form of the state space model of FIG. 3, where A, $B_1$, and $B_2$ are the system and input matrices.

$$A = \begin{bmatrix} 0 & 1 & 0 & 0 \\ 0 & \frac{-(C_f + C_r)}{mv} & \frac{(C_f + C_r)}{m} & \frac{l_r C_r - l_f C_f}{mv} \\ 0 & 0 & 0 & 1 \\ 0 & \frac{l_r C_r - l_f C_f}{l_z v} & \frac{l_f C_f - l_r C_r}{l_z} & \frac{-(l_f^2 C_f - l_r^2 C_r)}{l_z v} \end{bmatrix}$$

$$B_1 = \begin{bmatrix} 0 & \frac{C_f}{m} & 0 & \frac{l_f C_f}{l_z} \end{bmatrix}^T$$

$$B_2 = \begin{bmatrix} 0 & \frac{l_r C_r - l_f C_f}{mv} - v & 0 & \frac{-(l_f^2 C_f - l_r^2 C_r)}{l_z v} \end{bmatrix}^T$$

The relation between curvature and yaw rate, where $k_x$ and $k_r$ are the curvature of the vehicle and path is shown below.

$$\dot{\theta}_p = v k_r$$

$$\dot{\theta}_v = v k_x$$

$$\dot{X} = AX + B_1 \delta + B_2 v k_r$$

Traditionally $\delta$ is calculated using X, $k_x$, and $k_r$. Using a linear equation for $\delta$ in terms of X and the other variables defined in the above equation, then it is possible to obtain a transfer function for representation of the lateral dynamics. However, to generate a smooth trajectory, it is common to use the additional state of desired vehicle curvature $k_{xd}$, therefore $\delta$ becomes a function of $k_{xd}$, $k_x$, $k_r$, and X shown in the equation below. Finding a linear expression for $k_{xd}$ in terms of the X enables determining the closed loop transfer function.

$$\delta = f(k_{xd}, k_x, k_r, X)$$

Figure 4:
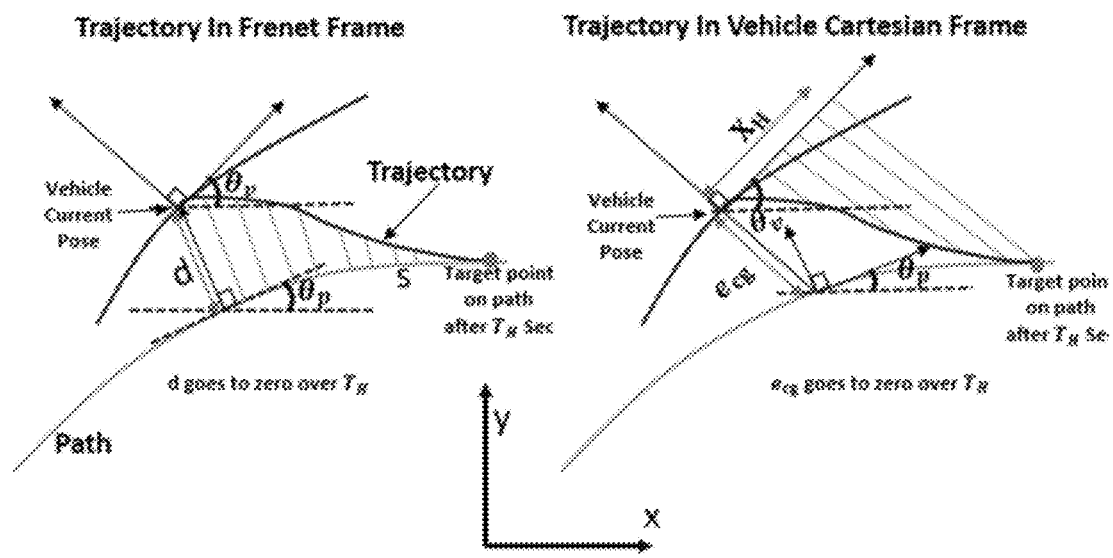
FIG. 4 show schematics of trajectory in a Frenet Frame and in a vehicle Cartesian frame.

Trajectory Planning:

There are several methods to generate a trajectory. The main goal while working on the trajectory generation is to reach the destination smoothly while mimicking human behavior. Trajectory is represented as a polynomial of certain order. Trajectory generation may be optimal and imitate human behavior when it is done in a Frenet frame and is represented through a quintic ($5^{th}$ order) polynomial. A Frenet frame along a curve is a moving coordinate system determined by a tangent line and curvature. The Frenet frame, which describes a point locally along a curve, changes orientation along the length of the curve. This frame is commonly used to describe motion of an object with respect to a path. The trajectory is generated and described in Frenet coordinates (s, d). Notation s denotes the distance traveled along the path and d denotes the perpendicular offset from the path as shown in FIG. 4.

A quintic polynomial provides continuity of the path's perpendicular offset d, and its first d' and second d" derivative with respect to s. This corresponds to continuity in the vehicle's lateral offset, heading, and lateral acceleration. Thus, this makes a quintic trajectory good for comfort driving.

The Frenet coordinates (d, d', d") are related as follows.

$$d' = \frac{d(d)}{ds}$$

$$d'' = \frac{d(d')}{ds}$$

The quintic trajectory polynomial is represented as shown below. From FIG. 4, at the initial point, the vehicle is at a distance 'd' away from the path, and to reach and align with the path, a trajectory is generated for a horizon time of $T_H$. In the equation, the variation of 'd' is defined with respect to time 't' ($0 < t < T_H$). It is assumed that the vehicle speed is constant. To get the coefficients of such a polynomial, the initial and the final condition of the variables (d, d', d") at t=0 and $t=T_H$ must be known (i.e., the initial and final condition of the perpendicular offset of the path).

$$d(t) = a_5 t^5 + a_4 t^4(t) + a_3 t^3(t) + a_2 t^2(t) + a_1 t^1(t) + a_0$$

FIG. 4 provides a comparison between Frenet and the vehicle Cartesian frame, Defining $T_H$ as the horizon time for which a trajectory should be generated and corresponding distance traveled by vehicle would be $X_H$, at the initial condition, the vehicle has a lateral offset of d and $e_{cg}$ in Frenet and the vehicle Cartesian frames respectively. This lateral offset should be reduced by zero after $T_H$ sec for the vehicle to align with the path. When this lateral offset is planned for a smooth transition from its initial to final condition, then it results in a smooth trajectory. However, based on the path, the trajectory can be different in Frenet and the vehicle's local Cartesian frame.

Frenet & Cartesian Coordinate Relation:

It is Important to understand how the generated trajectory in Frenet frame relates to the vehicle in the Cartesian frame, illustrated in FIG. 4. As shown, in the Frenet frame the lateral offset (d) is with respect to the path, while in the Cartesian frame ($e_{cg}$), the lateral offset is with respect to the vehicle. The relation between generated trajectory in the Frenet frame and its corresponding Cartesian frame is important as downstream use of the trajectory requires details in Cartesian coordinate. The opposite is true when transforming the X in path coordinate as obtained by the vehicle sensors to the Frenet frame when finding the initial and final conditions to solve for a trajectory.

Once solved for the quintic polynomial coefficients, the details of (d, d', d") at any point 't' on the horizon are obtained. This information may be converted into the vehicle's local coordinate with the help of following formulas:

$$d = e_{cg} \cos(\theta_e)$$

$$d' = (1 - k_r d) \tan(\theta_e)$$

$$d'' = -[k'_r d + k_r d'] \tan(\theta_e) + \frac{1 - k_r d}{\cos^2(\theta_e)}\left[k_x \frac{(1 - k_r d)}{\cos(\theta_e)} - k_r\right]$$

The above equations can be used interchangeably to convert the data from local ($e_{cg}$, $\theta_e$, $k_x$) to Frenet (d, d', d") coordinate or vice versa.

To solve for quintic polynomial coefficients shown in the equations below. Six conditions are needed because there are six unknown variables. This can be achieved by solving for the values of d, $\dot{d}$ and $\ddot{d}$ at t=0 denoted as (d(0), $\dot{d}$(0), $\ddot{d}$(0)) and $t=T_H$ denoted as (d($T_H$), $\dot{d}$($T_H$), $\ddot{d}$($T_H$)). Here, $\dot{d}$ is the first and $\ddot{d}$ is the second derivative of d with respect to time. This provides:

$$a_5 = \frac{-6}{T_H^5}d(0) - \frac{3}{T_H^4}\dot{d}(0) - \frac{0.5}{T_H^3}\ddot{d}(0) + \frac{6}{T_H^5}d(T_H) - \frac{3}{T_H^4}\dot{d}(T_H) + \frac{0.5}{T_H^3}\ddot{d}(T_H)$$

$$a_4 = \frac{15}{T_H^4}d(0) + \frac{8}{T_H^3}\dot{d}(0) + \frac{1.5}{T_H^2}\ddot{d}(0) - \frac{15}{T_H^4}d(T_H) + \frac{7}{T_H^3}\dot{d}(T_H) - \frac{1}{T_H^2}\ddot{d}(T_H)$$

$$a_3 = \frac{-10}{T_H^3}d(0) - \frac{6}{T_H^2}\dot{d}(0) - \frac{1.5}{T_H}\ddot{d}(0) + \frac{10}{T_H^3}d(T_H) - \frac{4}{T_H^2}\dot{d}(T_H) + \frac{0.5}{T_H}\ddot{d}(T_H)$$

$$a_2 = 0.5\ddot{d}(0)$$

$$a_1 = \dot{d}(0)$$

$$a_0 = d(0)$$

The following relation also holds true for when the vehicle velocity is constant:

$$\dot{d} = \frac{d(d)}{ds} * \frac{ds}{dt} = d'v$$

$$\ddot{d} = \frac{d(d')}{ds} \frac{ds}{dt} = d''v * v$$

Since at $T_H$ the vehicle aligns with the path, hence d($T_H$)=d'($T_H$)=d" ($T_H$)=0. However, to find the coefficients, it is necessary to determine (d(0), d'(0), d"(0)). However, from the Frenet and Cartesian coordinate relations above, it is evident that finding a linear expression of (d, d', d") in terms of X is not possible. Thus, there is a need to linearize this expression.

Figure 5:
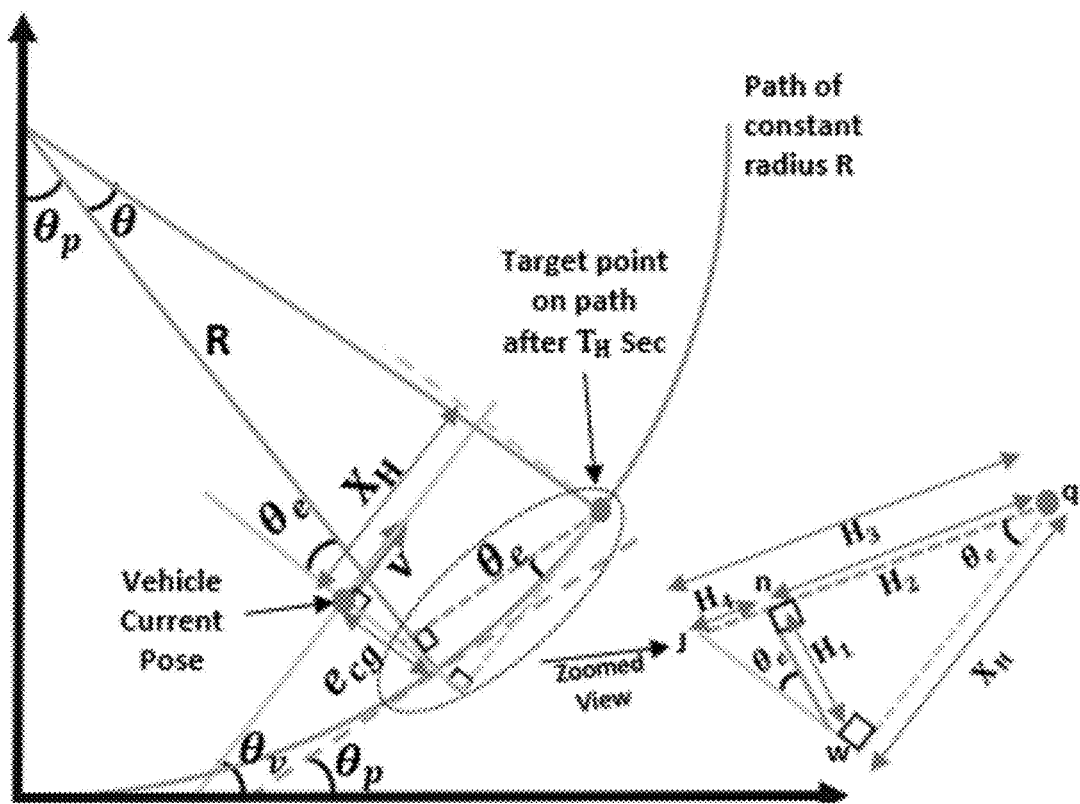
FIG. 5 is a schematic showing a path having constant curvature.

Linearizing the Model for Constant Curvature Path:

To linearize the model, scenarios with constant curvature ($k_r$=1/R=constant) and vehicle velocity are focused on. FIG. 5 illustrates such a scenario.

Here, with respect to the path, the vehicle is at an offset of $e_{cg}$ and heading $\theta_e$. The vehicle velocity is v, and a trajectory must be generated for the vehicle to align with the path after $T_H$ sec and corresponding distance of $X_H$ meters. The angular distance covered along the path during $T_H$ sec is θ.

The following equations may be derived from this scenario.

$$H_1 = R(1 - \cos(\theta))$$

$$H_3 = \frac{X_H}{\cos(\theta_e)}$$

$$H_4 = H_1 \tan(\theta)$$

$$H_2 = H_3 - H_4$$

$$H_2 = R \sin(\theta)$$

Based on these equations, the following can be determined:

$$\sin(\theta) - \tan(\theta_e)\cos(\theta) = \frac{X_H}{R\cos(\theta_e)} - \tan(\theta_e)$$

Assuming, $R \gg e_{cg}$ and $R \gg X_H$ $$\theta \sim= 0 \text{ \& } \theta_e \sim= 0$$

$$\sin(\theta) \cong \theta, \cos(\theta) = \cos(\theta_e) \sim= 1, \tan(\theta_e) \sim= \theta_e$$

After using the above assumptions, the following equation is arrived at:

$$\Theta = \frac{X_H}{R}$$

$$\dot{S} = \frac{\text{distance traveled on path}}{\text{time}} = \frac{R\,\theta\,v}{X_H} = V$$

$$\dot{S} = \frac{v\cos(\theta_e)}{1 - k_r d}$$

From the above equations, it can be concluded that:

$$(1 - k_r d) = 1,\ k'_r = \frac{dk_r}{ds} = 0 \text{ (Constant Curvature)}$$

With all the derived results, the relation between Frenet and Cartesian coordinates can be simplified.

$$d = e_{cg}$$
$$d' = \theta_e$$
$$d'' = k_x - k_r$$
$$\dot{d}(0) = \theta_e v$$
$$\ddot{d}(0) = \theta_e v$$

Revisiting the trajectory planning module, the higher derivatives of the variation of path lateral offset are:

$$d(t) = a_5 t^5 + a_4 t^4 + a_3 t^3 + a_2 t^2 + a_1 t^1 + a_0$$
$$\dot{d}(t) = 5a_5 t^4 + 4a_4 t^3 + 3a_3 t^2 + 2a_2 t^1 + a_1$$
$$\ddot{d}(t) = 20a_5 t^3 + 12a_4 t^2 + 6a_3 t^1 + 2a_2$$
$$\dot{d}(t) = \frac{d(d)}{ds} * \frac{ds}{dt} = d' * v$$
$$\ddot{d}(t) = \frac{d(d')}{ds} * \frac{ds}{dt} = d'' * v * v = (k_x - k_r)v * v = \theta_e v$$

The initial and final conditions of vehicle pose in Frenet coordinates along the trajectory can be used to derive the quintic polynomial coefficients.

Hence at any time t ($0 < t < T_H$) on the trajectory is:

$$d'' = \left(\frac{-120 t^3}{v*v*T_H^5} + \frac{180 t^2}{v*v*T_H^4} + \frac{-60 t^1}{v*v*T_H^3}\right) e_{cg} +$$
$$\left(\frac{-60 t^3}{v*T_H^4} + \frac{96 t^2}{v*T_H^3} + \frac{-36 t^1}{v*T_H^2}\right)\theta + \left(\frac{-10 t^3}{v*T_H^3} + \frac{18 t^2}{v*T_H^2} + \frac{-9 t^1}{v*T_H^1}\right)\theta_e$$

This may be defined as:

$$N_1 = \frac{-120 t^3}{v^2 T_H^5} + \frac{180 t^2}{v^2 T_H^4} - \frac{60 t^1}{v^2 T_H^3}$$

$$N_2 = 0$$

$$N_3 = \frac{-60 t^3}{v T_H^4} + \frac{96 t^2}{v T_H^3} - \frac{36 t^1}{v T_H^2}$$

$$N_4 = \frac{-10 t^3}{v T_H^3} + \frac{18 t^2}{v T_H^2} - \frac{9 t^1}{v T_H^1}$$

$$N_{cc} = [N_1\ N_2\ N_3\ N_4]$$

$$d'' = N_{cc}\,X$$

Thus, from the above equations, a linear expression to obtain the value of desired curvature at any point t on the trajectory is obtained. The gains derived above vary with velocity, look ahead time, and horizon time. On a constant radius path, a linear expression of (d, d', d") is derived in terms of X. Here, the gain $N_{cc}$ varies with t, $T_H$, and v.

Motion Controller:

Once the trajectory planner outputs the details of trajectory required to take the vehicle from current pose to the target point in horizon time $T_H$, the next step is to obtain the desired steering command. The trajectory contains the information of desired vehicle pose over the time $T_H$ in Frenet (d, d', d") and respective local (i.e., Cartesian) ($e_{cg}$, $\theta_e$, $k_x$) frame. Any of this information may be used to generate a control command. If the vehicle follows the trajectory curvature, the vehicle will reach the end point while satisfying the initial and final conditions. The next step is to select the target curvature command from the trajectory. This is done by setting a look-ahead time '$t_{la}$', such that $0 < t_{la}$ ($< T_H$) and picking the trajectory's curvature value at that point. Due to overall system dynamics, there is usually some system delay between the desired curvature ($\kappa_{xd}$) and the actual host vehicle curvature ($\kappa_x$) achieved. Hence, a look-ahead time close to this delay time is chosen to help with the compensation. Note that an alternative option is to use the lateral position error and the heading error along the trajectory to calculate a steering angle command. However, the planning is already being done iteratively, and is reacting to lateral and heading errors with respect to the centerline path. Hence, the methodology mentioned above may be optimal. Also, the curvature controller may be simpler to implement and tune as it involves only one state.

Curvature Control:

Generating a steering angle command to achieve the desired curvature can be done using a feedforward and feedback control. From the kinematic bicycle model (FIG. 3), the relation between the vehicle wheelbase (L), curvature, and steering angle is known while the understeer gradient ($K_{US}$) relates the lateral acceleration to the steering angle. Thus, the feed-forward component combines the above discussed concept. However, because of non-linearity in the model and presence of disturbances, some portion of feedback control may be added by calculating the error between desired $\kappa_{xd}$ and actual curvature $\kappa_x$ and applying the gains.

$$\delta_d = (L + K_{us} \cdot v^2)k_{xd} + \left(K_P \cdot k_e + K_D \dot{k}_e + K_I \int k_e\right)$$

where, $k_e = k_{xd} - k_x$

The feedback term consists of PID control applied to the curvature error between desired and host curvature.

Steering Angle Command in Terms of State:

The $\delta$ is a function of $k_{xd}$, $k_x$, $k_r$ and X. Because d" is a function of X, $\delta$ in terms of X and $k_r$ may be determined. This provides a closed loop transfer function. With the details of d" at any point of time t ($0<t<T_H$) on the trajectory, then the desired curvature $k_{xd}$ at t is given by:

$$k_{xd} = d'' + k_r = N_{cc}X + k_r$$

$$k_e = k_{xd} - k_x = N_{cc}X + k_r - k_x$$

$$k_e = N_{cc}X - \frac{\theta_e}{v}$$

$$N_{er} = [N_1 \; N_2 \; N_3 \; (N_4 - 1/v)]$$

$$k_e = N_{er}X$$

$$N_{ff} = (L + K_{us} \cdot v^2)$$

$$\delta = (N_{ff}N_{cc} + K_P N_{er})X + N_{ff}k_r + K_D N_{er}\dot{X} + K_I \int N_{er}X$$

Practical Application:

The next step is to use this derived model for system analysis and parameter tuning using simulation and later test in the vehicle. However, the system parameters may be identified which will facilitate generation of Bode plots to give an insight about the system. Thus, the goal is to find the system unknown parameters (Cf, Cr, Iz, UG).

System Identification:

From the bicycle model defined as shown in FIG. 2, the steering angle is an input to the system which generates the yaw rate and angular velocity. While most of the parameters in this model are known from, for example, a vehicle specification sheet, the values of $C_f$, $C_r$, and $I_z$ are not easily available, and may require experimentation to get their accurate values.

$$\begin{bmatrix} \dot{v}_y \\ \dot{\theta}_v \end{bmatrix} = \begin{bmatrix} \frac{-(C_f + C_r)}{mv} & \frac{l_r C_r - l_f C_f}{mv} - v \\ \frac{l_r C_r - l_f C_f}{I_z v} & \frac{-(l_f^2 C_f + l_r^2 C_r)}{I_z v} \end{bmatrix} \begin{bmatrix} v_y \\ \theta_v \end{bmatrix} + \begin{bmatrix} \frac{C_f}{m} \\ \frac{l_f C_f}{I_z} \end{bmatrix} \delta$$

Data collection in the concerned region of the plant dynamics is the first step to identify a system. Since the bicycle model varies with velocity the test data may be collected at various velocities, with varying steering angle inputs in the form of sinusoid (chirp) and step command. The typical operating frequency of many steering systems is 2 Hz. Accordingly, the data may be collected to include this frequency. That is, data may be collected from a vehicle during one or more test drives. The vehicle may record sensor data from various sensors (e.g., steering wheel angle sensors, accelerometers, GPS sensors, wheel speed sensors, etc.). The sensor data may be transferred to a computing device (e.g., a mobile device, laptop, a server, etc.) via wired or wireless communication. The data may also be taken in two sets of lower and higher frequencies. This example illustrates the case at a velocity of 50 mph.

One important step before system identification is to determine the steering bias, which is the non-zero steering angle for straight road driving. Tire adjustment and suspension effects may affect a non-zero steering bias. The bicycle model is developed considering zero steering bias; hence the steering bias should be identified and accounted for in the analysis (e.g., via recording sensor data while a vehicle is traveling along a road).

The steering bias may be identified by determining the steering angle value required to make the vehicle follow a straight path with hands-on the steering wheel and to determine the settling value with hand-off the steering wheel on a straight road with no banking. With multiple runs and averaging the data, in the illustrated example, a final value of −3.5 handwheel degree as bias is obtained.

A programming and/or numeric computer platform (e.g., Matlab) may be used for Bode plot generation. For example, the command "tfestimate" (Signal Processing Toolbox in Matlab) may generate Bode plots using the time-domain test data, where steering bias is accounted for. This command outputs the magnitude and phase of the transfer function, where the input was steering angle and output was yaw rate.

Optimization:

After generating the Bode plot from the test data, the unknown parameters are identified so that the system response matches with the test data in frequency or time domain. An open-source optimization script may be used (e.g., in Matlab) to identify the parameters. This method does not need an analytical derivative of the cost function, and it is robust to noisy data.

The input to the optimization script is the cost function along with initial and final boundary conditions of parameters. This cost function may be formulated according to the problem. The objective function may be generated to output the error between the magnitude and phase respectively of the transfer function from test data and one using the optimized parameters. The aim is to minimize the objective function output.

$$\text{Objective Function} = \sum w1f \times \|(\text{Magnitude Data} - \text{Magnitude Model})\| f = 10f = 0.1 + w2f \times \|(\text{Phase Data} - \text{Phase Model})\|$$

Figure 6:
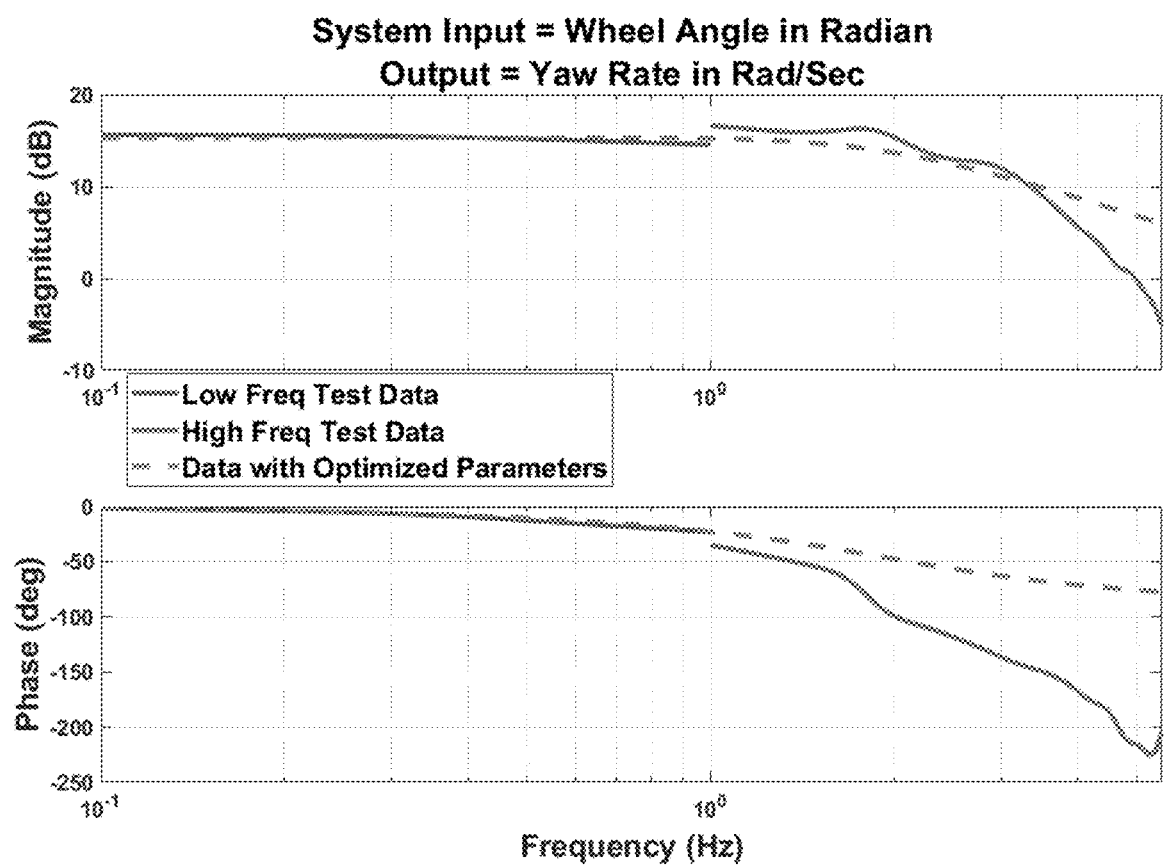
FIG. 6 show plots of Bode plot matching with test data.

The objective function may be formulated such that the different weights can be used at different sections when doing the frequency domain optimization. Here, more weight is on magnitude error compared to phase error. Also, more weight may be considered at around operable range of 0.1-2 Hz (e.g., common operating frequencies of steering systems). After running the optimization script, FIG. 6 shows that the matching in this example is poor at higher frequencies.

In some examples, the phase match is not as good as the magnitude match and the higher frequency matching for both magnitude and phase may also not be perfect. The reasons for this could be the presence of multiple transfer functions which are not accounted for that are dominating at higher frequencies. However, because the matching is good at the normal operating range of 0.1-2 Hz, the results are generally acceptable.

Similarly, the understeer gradient may be obtained by driving along a constant radius circle and using the below equation to find $K_{us}$.

$$\delta = (L + K_{us} \cdot v^2)\kappa_x$$

The below table shows the value of identified parameters.

| Cf | Cr | Iz | $K_{us}$ |
|---|---|---|---|
| 213020 | 253300 | 2207.3 | 0.0030 |

Deriving the Transfer Function:

The final step is to find a closed loop transfer function:

$$\dot{X} = AX + B_1\delta + B_2 v k_r$$

Thus, δ is:

$$\delta = (N_{ff}N_{cc} + K_P N_{er})X + N_{ff}k_r + K_D N_{er}\dot{X} + K_I \int N_{er} X$$

Replacing δ results in:

$$\dot{X} = (A + B_1 N_{ff} N_{cc} + B_1 K_P N_{er})X +$$

$$B_1 K_I \int N_{er} X + B_1 K_D N_{er}\dot{X} + (B_1 N_{ff} + B_2 v)k_r$$

Taking the Laplace transformation (s-domain) results in:

$$sX(s) = (A + B_1 N_{ff} N_{cc} + B_1 K_P N_{er})X(s) +$$

$$s^{-1} B_1 K_I N_{er} X(s) + s B_1 K_D N_{er} X(s) + (B_1 N_{ff} + B_2 v)k_r(s)$$

Rearranging the above equation results in:

$$sX(s) = \left(A + B_1 N_{ff} N_{cc} + B_1 K_P N_{er} + s^{-1} B_1 K_I N_{er} + s B_1 K_D N_{er}\right)X(s) +$$

$$(B_1 N_{ff} + B_2 v)k_r(s)$$

This results in the follow equation:

$$\frac{X}{k_r} = \frac{G_1}{G(s)}$$

Where:

$$G_1 = B_1 N_{ff} + B_2 v$$

$$G(s) = \left(sI - \left(A + B_1 N_{ff} N_{cc} + B_1 K_P N_{er} + s^{-1} B_1 K_I N_{er} + s B_1 K_D N_{er}\right)\right)$$

Figure 7:
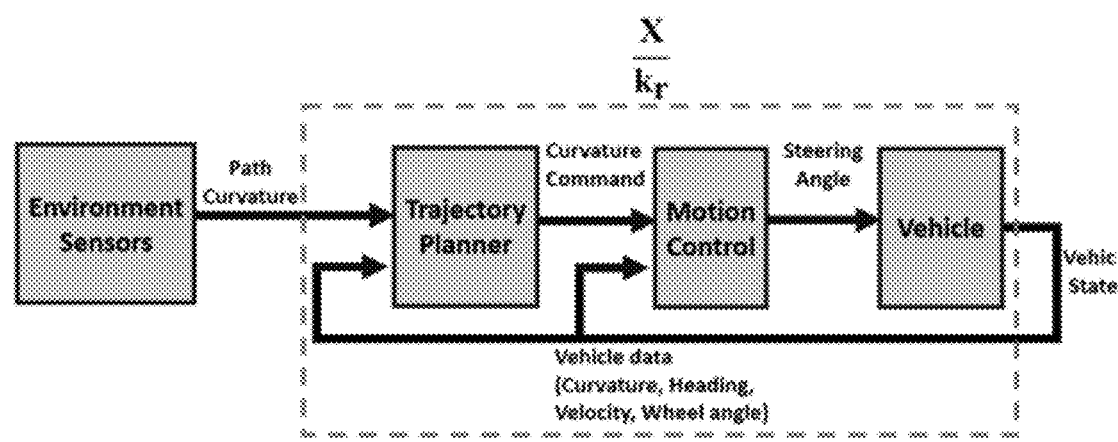
FIG. 7 is a block diagram showing the derived transfer function.
Figure 8:
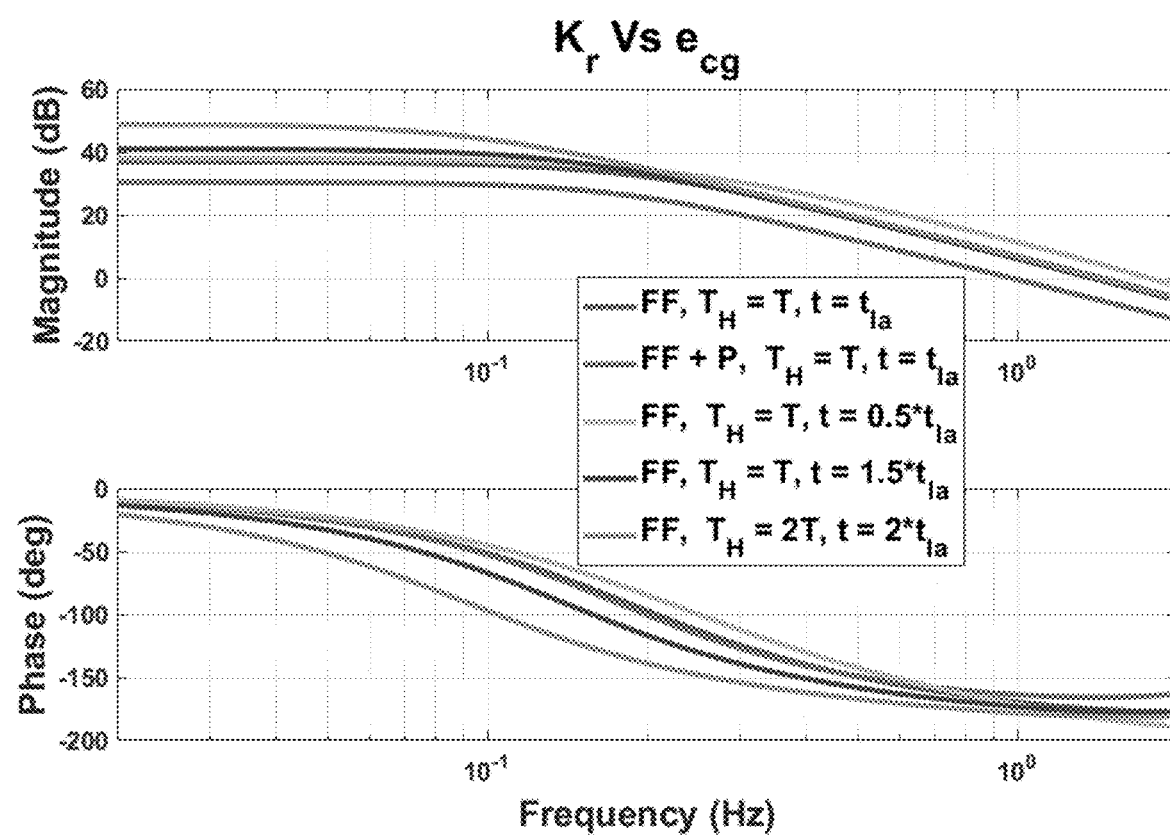
FIGS. 8-11 show Bode plots for different states.
Figure 9:
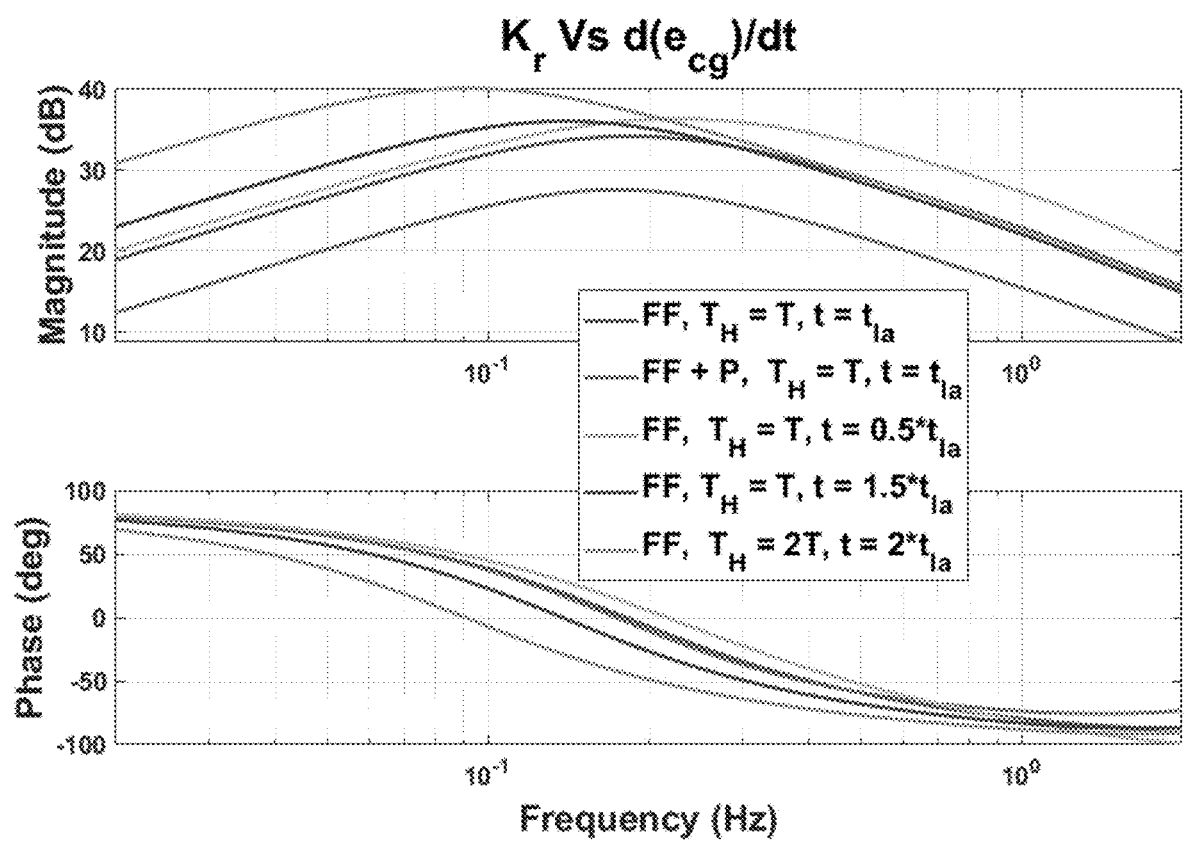
Figure 10:
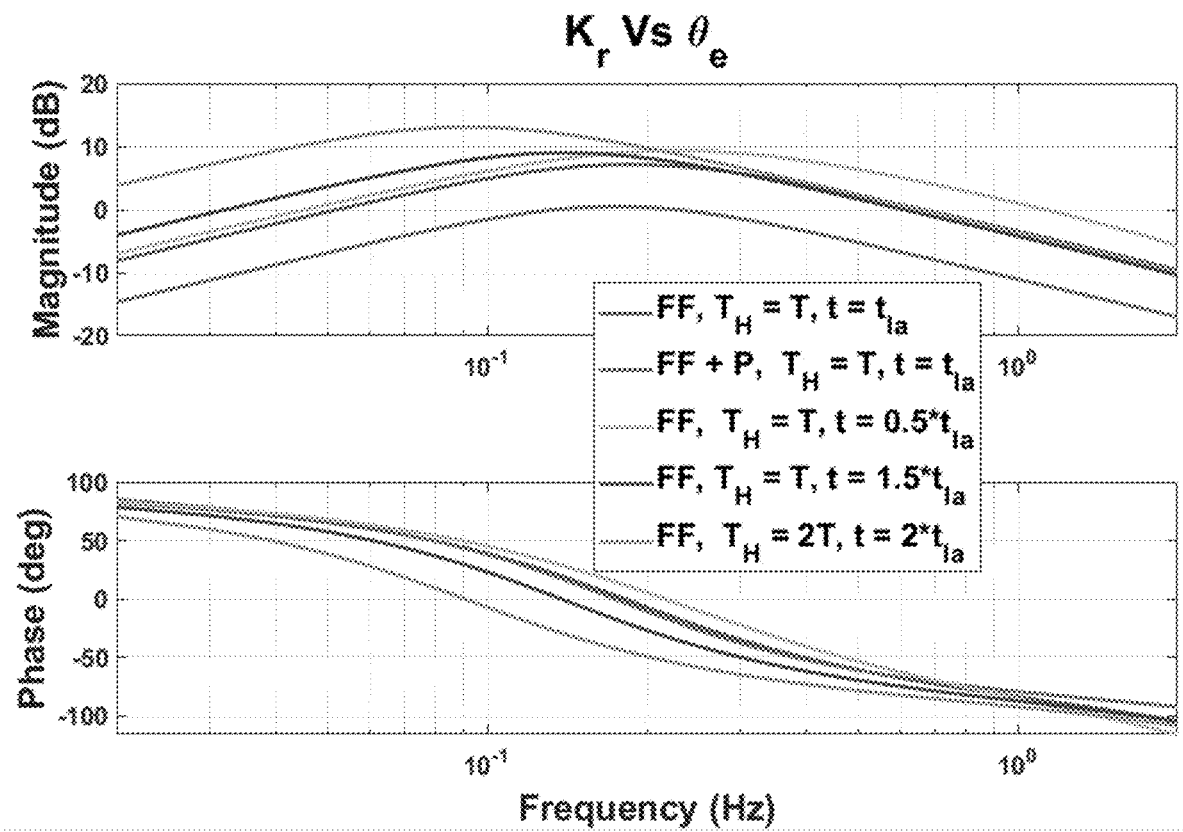
Figure 11:
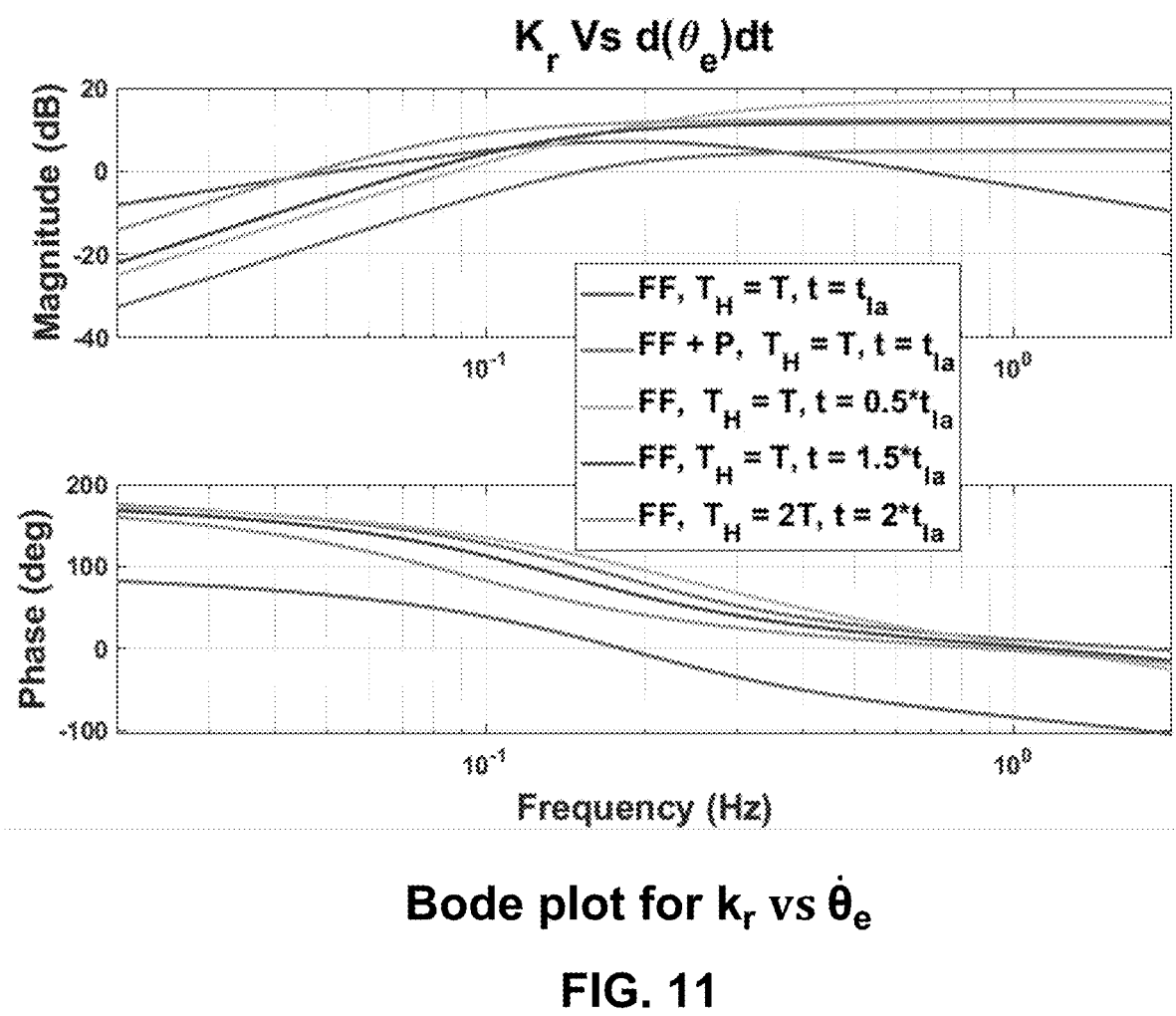

Thus, from the above equations, the transfer function where the input is road curvature and output is vehicle states is obtained. FIG. 7 shows the block diagram of the closed loop transfer function.

Bode Plot Generation:

For Bode plot generation, it may be assumed that $K_I = K_D = 0$. Now the only parameters which can change the plant behavior is $T_H$, t, $K_P$. Using, for example, Matlab, Bode plots of each state can be generated (see FIGS. 8-11).

For this analysis, the following trials were conducted in this example:

FF = Feedforward Control

FF + P = Feedforward + Proportional Feedback Control $T_H = T$ (Horizon time)

$t = t_{la}$ (Look ahead time)

For Bode plot generation, it is assumed that $K_I = K_D = 0$ and the resulting transfer functions for all four state in X is found. Now the only parameters which can change the plant behavior is $t_{la}$, $T_H$, and $K_p$. Using a tool such as MATLAB, Bode plots of each state may be generated (FIGS. 8-11 for $e_{cg}$, $\dot{e}_{cg}$, $\theta_e$ and $\dot{\theta}_e$ respectively).

The test configuration used for the Bode plot generation in these examples includes two types of control commands, one with just feedforward component and another test set with both feedforward and proportional control. The abbreviation FF refers to only feedforward used while FF+P refers to feedforward and proportional controls both used. Other parameters which are included for analysis are $T_H$ and t. The base test configuration has only a feedforward control, $T_H = T$, and $t = t_{la}$ as the look ahead time. The Bode plots are generated using data processing hardware (e.g., a processor or the like) and may be transmitted to a display for viewing by a user.

FIGS. 8-11 show the effect of the test configuration on the four states in X. From the above plots, there may always be some steady-state error in $e_{cg}$ which reduces with the addition of proportional feedback control. Changing the look ahead time, t, from an optimal value, also results in an increase in the steady state error. The same trend continues with increasing $T_H$.

Additionally, $\theta_e$ shows a slight increase in magnitude at 0.2 Hz for the base configuration. This can lead to some noticeable oscillations in the vehicle's lateral motion. This frequency does not change significantly with any other parameters except $T_H$. The effect of adding a proportional control does not change this frequency, but it is changing the amplitude. Following table presents a summary of the analysis.

| Config | FF | P | $T_H$ | t | Steady State Error |
|---|---|---|---|---|---|
| Test 1 | 1 | 0 | T | $t_{la}$ | Base |
| Test 2 | 1 | K | T | $t_{la}$ | Decrease |
| Test 3 | 1 | 0 | T | $0.5 t_{la}$ | Increase |
| Test 4 | 1 | 0 | T | $1.5 t_{la}$ | Increase |
| Test 5 | 1 | 0 | 2T | $2 t_{la}$ | Increase |

Vehicle Test Results:

The final validation of the model may be confirmed with lane centering tests in a real vehicle at the same speed. In this example, an SUV vehicle with an activated lane centering feature is used on a path with constant radius long enough to reach the steady state. The vehicle speed was kept constant at 50 mph. The path radius here is calculated to be of 760 m (FIGS. 12A and 12B) using the vehicle sensors.

These example tests include two sets of control configuration. A first test with feedforward alone and a second test with both feedforward and proportional control together. While $T_H$ is changed from T to 2T, the look ahead time t is changed from $t_{la}$ to $2t_{la}$. The details of corresponding test configuration and summary of the results is presented in the table below.

Figure 12A:
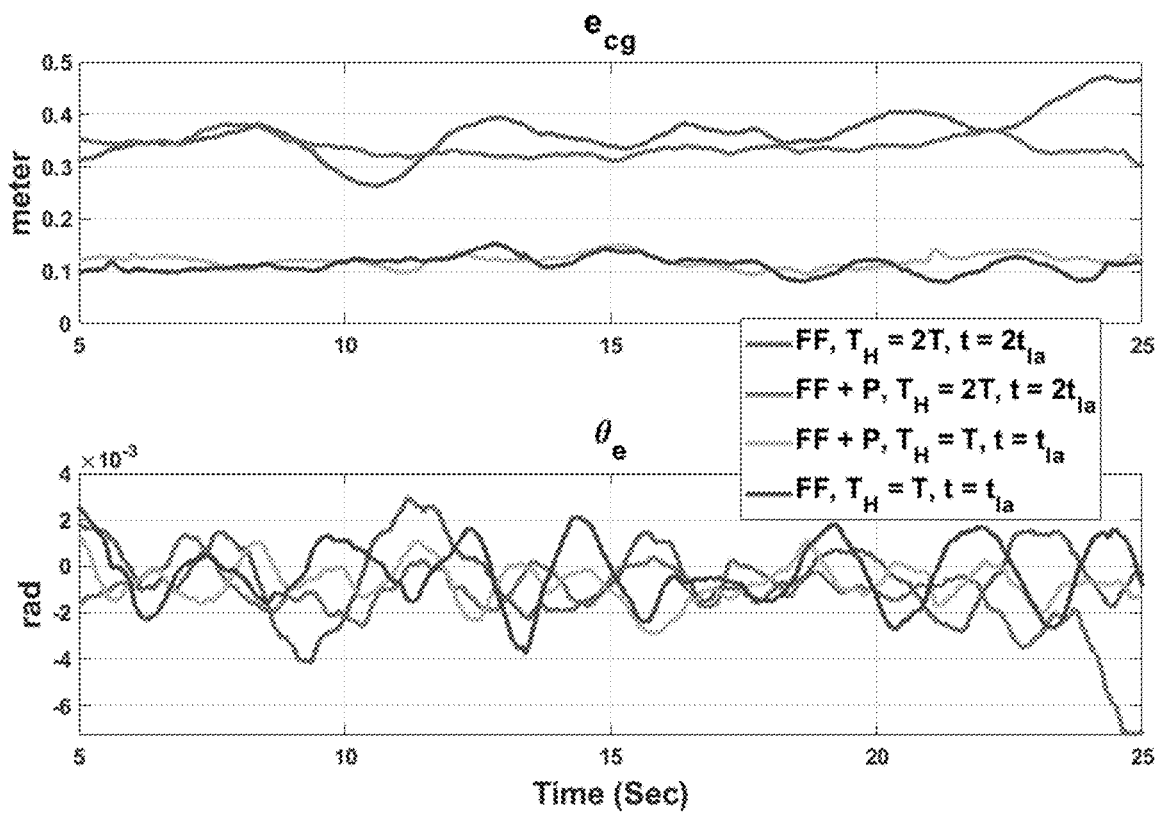
FIGS. 12A and 12B show vehicle test results for a radius of 760 meters.
Figure 12B:
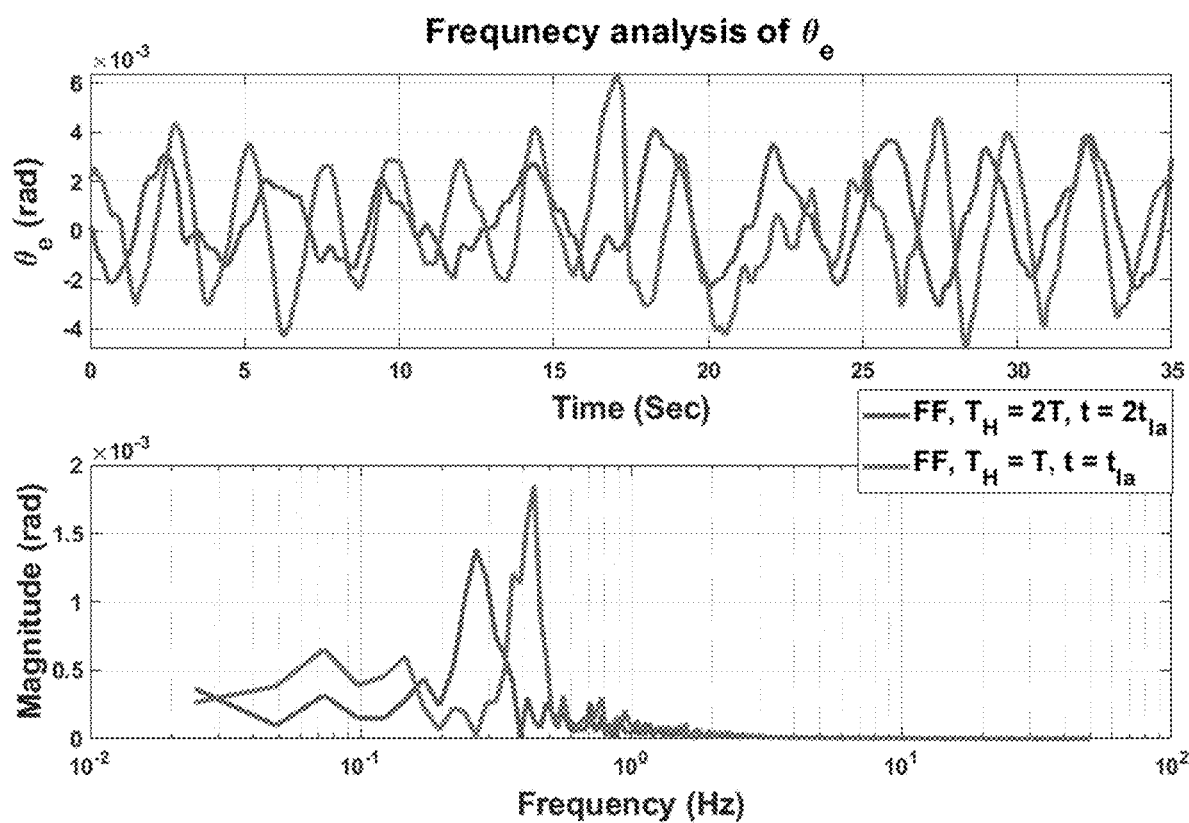

FIGS. 12A and 12B illustrate data from a real vehicle, As predicted from the results of Bode plot analysis, the error in $e_{cg}$ increases with $T_H$. However, with the addition of the proportional term, the error in $e_{cg}$ did not decrease significantly. This reduction of error also depends on the value of proportional gain K. Further increasing the value of K can give better results. From the Bode plot of $e_{cg}$, the steady-state magnitude for Test 6 is 48.85 dB and for Test 9 is 30.44 dB. This magnitude gives $e_{cg}$ of 0.36 m and 0.09 m for a road of radius 760 m. The vehicle test data (collected on 760 m radius road) also shows the steady-state value of $e_{cg}$ as approximately 0.35 and 0.1 meters respectively. This indicates that the derived transfer function mimics the actual vehicle dynamics.

Effect of control parameters on lane centering feature performance in real vehicle:

| Config | FF | P | $T_H$ | t | $e_{cg}$ Steady State Error | $\theta_e$ Peak Frequency |
|---|---|---|---|---|---|---|
| Test 6 | 1 | 0 | 2T | $2t_{la}$ | Increase | Decrease |
| Test 7 | 1 | K | 2T | $2t_{la}$ | Increase | Decrease |
| Test 8 | 1 | K | T | $t_{la}$ | Base | Base |
| Test 9 | 1 | 0 | T | $t_{la}$ | Increase | Base |

It can be seen that there are oscillations present in $\theta_e$ and its frequency decreases from 0.43 Hz to 0.26 Hz when $T_H$ is changed from T to 2T in Test 8 vs Test 6, which follows a similar trend observed in Bode plot analysis of $\theta_e$ (FIG. 12B). FIG. 12B also shows that the amplitude of $\theta_e$ has decreased slightly in Test 6. The effect of proportional control also matches from the Bode plot analysis for $\theta_e$. From FIG. 12A, it can be observed that when the proportional control is added, the oscillation frequency remains similar but the amplitude decreases. This is visible in Test 8 versus Test 9 and Test 6 versus Test 9 comparisons.

Summary/Conclusions:

Implementations herein combine the different modules present in a lane centering feature of a vehicle and represent the different modules as a mathematical model. The different modules may include trajectory planning, motion controls, and/or a vehicle model. The derived plant helps to first identify the parameters which have effect on the lateral dynamics and then analyze and tune the model easily. The model reduces the complexity of tuning each module separately and then again tuning them in a combined form. From the results it can be seen that the model closely matches with actual vehicle dynamics proving the derivation useful for in-vehicle tests. Examples herein were performed with a specific motion controller, however implementations herein can be easily used with any motion controller using the Frenet trajectory planner as all the trajectory states are linearized. Examples herein were performed at a particular velocity of 50 mph, however, any velocity may be selected.

Thus, implementations herein describe the effects of a trajectory planning module and a motion control module on the vehicle lateral control performance. The nonlinear representation of trajectory may be simplified for common use cases of the lane centering feature. This allows for the derivation of a closed-loop linear transfer function(s) and an understanding of the effect of trajectory generation parameters on the dynamics of various error states. Steady-state error as well as oscillations are important comfort parameters for features like lane-centering. The in-vehicle behavior agrees with the frequency-domain analysis when analyzed for constant radius cases. These systems and methods can be a crucial tool to improve performance of lateral ADAS features and tune them easily. That is, based on the model, an ADAS of a vehicle (e.g., a lane centering system), may be adjusted to improve the efficiency, accuracy, and/or safety of the system. The adjustment may be performed using, for example, a computing system (e.g., an ECU, processor, or other data processing hardware) to adjust one or more values, weights, or parameters of the ADAS. It is possible to use different forms of trajectory generation methods (cubic polynomial or higher-order polynomial) and use similar analysis to understand their tracking performance. It is possible to further improve the vehicle system identification by using a higher-order vehicle model to include unmodeled dynamic effects to get more accurate results. The analysis may be performed at different vehicle speeds.

A computing device may be used to implement the systems and methods described herein. The computing device may represent various forms of digital computers, such as laptops, desktops, workstations, personal digital assistants, servers, blade servers, mainframes, and other appropriate computers. The computing device includes a processor, memory, a storage device, a high-speed interface/controller connecting to the memory and high-speed expansion ports, and a low speed interface/controller connecting to a low speed bus and a storage device. Each of the components are interconnected using various busses, and may be mounted on a common motherboard or in other manners as appropriate. The processor can process instructions for execution within the computing device, including instructions stored in the memory or on the storage device to display graphical information for a graphical user interface (GUI) on an external input/output device, such as a display coupled to a high speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The sensors and system may utilize aspects of the sensors and systems described in U.S. Publication Nos. US-2023-0134480; US-2023-0008230; US-2022-0363250 and/or US 2022-0135030, which are all hereby incorporated herein by reference in their entireties. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for adjusting an advanced driving assist system for a vehicle, the method comprising:
   determining a quintic polynomial in a Frenet frame associated with a vehicle, wherein the quintic polynomial represents a non-linear trajectory of the vehicle;
   determining a plurality of coefficients of the quintic polynomial;
   determining, using the quintic polynomial and the plurality of coefficients, a linear expression that represents a respective trajectory at a respective point along the non-linear trajectory of the vehicle;
   modeling, using the linear expression, vehicle dynamics of the vehicle;
   simulating a target path for the vehicle;
   determining an offset of the non-linear trajectory of the vehicle relative to the simulated target path;
   determining a target point along the simulated target path;
   determining, using the model, a steering command to maneuver the vehicle toward the target point along the simulated target path; and
   adjusting an advanced driving assist system based at least in part on the steering command.

2. The method of claim 1, wherein a simulated speed of the vehicle is constant.

3. The method of claim 1, wherein determining the plurality of coefficients of the quintic polynomial comprises using an initial condition and a final condition of the quintic polynomial.

4. The method of claim 3, wherein the initial condition and the final condition are of a perpendicular offset of the non-linear trajectory of the vehicle.

5. The method of claim 1, wherein the advanced driving assist system comprises a lane centering system.

6. The method of claim 5, wherein adjusting the lane centering system comprises adjusting a steering command to control lateral movement of the vehicle.

7. The method of claim 6, wherein adjusting the steering command comprises selecting a look ahead time and determining a curvature value of the non-linear trajectory at the look ahead time.

8. The method of claim 1, wherein the method further comprises determining a steering bias of the vehicle.

9. The method of claim 1, wherein the method further comprises determining, using a cost function, a plurality of system identification parameters.

10. The method of claim 9, wherein the plurality of system identification parameters comprise at least one selected from the group consisting of (i) front cornering stiffness, (ii) rear cornering stiffness and (iii) moment of inertia.

11. The method of claim 1, wherein the method further comprises determining a closed loop transfer function that represents lateral dynamics of the vehicle.

12. A method for adjusting a lane centering system for a vehicle, the method comprising:
- determining a quintic polynomial in a Frenet frame associated with a vehicle, wherein the quintic polynomial represents a non-linear trajectory of the vehicle;
- determining an initial condition and a final condition of the quintic polynomial;
- determining a plurality of coefficients of the quintic polynomial based at least in part on the initial condition and the final condition;
- determining, using the quintic polynomial and the plurality of coefficients, a linear expression that represents a respective trajectory at a respective point along the non-linear trajectory of the vehicle;
- modeling, using the linear expression, vehicle dynamics of the vehicle;
- simulating a target path for the vehicle;
- determining an offset of the non-linear trajectory of the vehicle relative to the simulated target path;
- determining a target point along the simulated target path;
- determining, using the model, a steering command to maneuver the vehicle toward the target point along the simulated target path; and
- adjusting a lane centering system based at least in part on the steering command.

13. The method of claim 12, wherein the initial condition and the final condition are of a perpendicular offset of the non-linear trajectory of the vehicle.

14. The method of claim 12, wherein a simulated speed of the vehicle is constant.

15. The method of claim 12, wherein adjusting the lane centering system comprises adjusting a steering command to control lateral movement of the vehicle.

16. The method of claim 12, wherein the method further comprises determining a steering bias of the vehicle.

17. A method for adjusting an advanced driving assist system for a vehicle, the method comprising:
- determining a quintic polynomial in a Frenet frame associated with a vehicle, wherein the quintic polynomial represents a non-linear trajectory of the vehicle;
- determining a plurality of coefficients of the quintic polynomial;
- determining, using the quintic polynomial and the plurality of coefficients, a linear expression that represents a respective trajectory at a respective point along the non-linear trajectory of the vehicle;
- determining a closed loop transfer function that represents lateral dynamics of the vehicle;
- simulating a target path for the vehicle;
- determining an offset of the non-linear trajectory of the vehicle relative to the simulated target path;
- determining a target point along the simulated target path;
- determining, using the closed loop transfer function, a steering command to maneuver the vehicle toward the target point along the simulated target path; and
- adjusting an advanced driving assist system based at least in part on the steering command.

18. The method of claim 17, wherein the method further comprises determining, using a cost function, a plurality of system identification parameters.

19. The method of claim 18, wherein the plurality of system identification parameters comprise at least one selected from the group consisting of (i) front cornering stiffness, (ii) rear cornering stiffness and (iii) moment of inertia.

20. The method of claim 17, wherein a simulated speed of the vehicle is constant.

* * * * *